J. P. Gruger.
Envelope Opener.
Nº 104,018.     Patented Jun. 7, 1870.
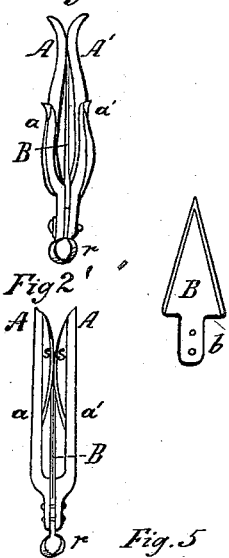
Witnesses.
Charles Burmester
John Bonner.
Inventor.
John P. Gruger

UNITED STATES PATENT OFFICE.

JOHN P. GRUGER, OF PHILADELPHIA, PENNSYLVANIA, ASSIGNOR TO HIMSELF AND FREDERICK RODRIGO, OF SAME PLACE.

IMPROVEMENT IN ENVELOPE-OPENERS.

Specification forming part of Letters Patent No. 104,018, dated June 7, 1870; antedated May 27, 1870.

*To all whom it may concern:*

Be it known that I, JOHN P. GRUGER, of Philadelphia, in the State of Pennsylvania, have invented certain Improvements in a Device for Opening Envelopes and Packages, of which the following is a specification.

The nature of my invention consists in the manner of constructing a cutting-blade especially adapted for opening envelopes, leaves in books, &c., or severing fine cords on packages, by a neat and ornamental device that may be attached to a watch-guard, made of any desired material.

The drawings clearly show the configuration and construction of the same.

Figure 1 is a front view; Figs. 2 2', side views; Fig. 3, a perspective view of the parts combined; Fig. 4, the same chased and ornamented, suspended to a watch-guard. The applications to useful purposes are severally illustrated by Figs. 5 and 6.

The side pieces, A A' $a$ $a'$, embrace or cover the triangular blade B, with its neck $b$. Its position is also shown in Fig. 1, forming a stem for a ring, $r$, and secured to the side pieces by two rivets, as shown, the knife-blade B crossing the open slot between the curved side wings or leaves, $a$ $a'$, and the point centrally between the center leaves, A, which come nearly in contact beyond the point, and curve outward at their ends, so as to operate spring-fashion; or thin plates of steel, $s$, may be inserted, as in Fig. 2', so as to secure a smooth and straight cut, always in position and protected and peculiarly well adapted for opening envelopes without fear of mutilating the contents, as also for cutting the leaves in books, and various purposes. For severing a thread or cord around a package, by simply inserting either of the side wings or leaves, $a$, under the same, the projecting or widened base of the blade will effectually sever it.

I am aware that blades moving on a pivot and protected by side pieces, either in connection with a lead-pencil or watch-key, have been used; but I am not aware of any device constructed and adapted to cut with equal facility, whichever side is held up, either a cord or for opening an envelope.

While this trifoliate device is neat and ornamental, it combines several other valuable features that cannot fail to make it a universal favorite for the purpose.

What I claim as my invention, and desire to secure by Letters Patent, is—

The combination and arrangement of the covering-plates or side pieces, A A' $a$ $a'$, and blade B, with its duplicate cutting edge, and stem $b$, made in the manner shown and for the purpose specified.

JOHN P. GRUGER.

Witnesses:
F. RODRIGO,
WM. P. HIBBERD.